United States Patent

[11] 3,614,749

[72] Inventor Arthur J. Radcliffe, Jr.
Plymouth, Mich.
[21] Appl. No. 829,426
[22] Filed June 2, 1969
[45] Patented Oct. 19, 1971
[73] Assignee Burroughs Corporation
Detroit, Mich.

[54] INFORMATION STORAGE DEVICE
5 Claims, 4 Drawing Figs.

[52] U.S. Cl. .......... 340/173 R, 340/173 CA, 307/238, 307/279
[51] Int. Cl. .......... G11c 11/24, G11c 11/40
[50] Field of Search .......... 307/238, 279; 340/173

[56] References Cited
UNITED STATES PATENTS

| | | | |
|---|---|---|---|
| 3,211,984 | 10/1965 | Jones | 340/173 |
| 3,387,286 | 6/1968 | Dennard | 340/173 |

*Primary Examiner*—Terrell W. Fears
*Attorneys*—Kenneth L. Miller and Wallace P. Lamb

ABSTRACT: An information storage device comprising a capacitive memory cell utilizing a pair of insulated gate field-effect transistors controlling the "read" and the "write" operations of the cell. A capacitor is electrically connected to both transistors to function as the information storage element of the cell. The capacitor may be either a discrete component or it may be formed on the same substrate as are the two transistors.

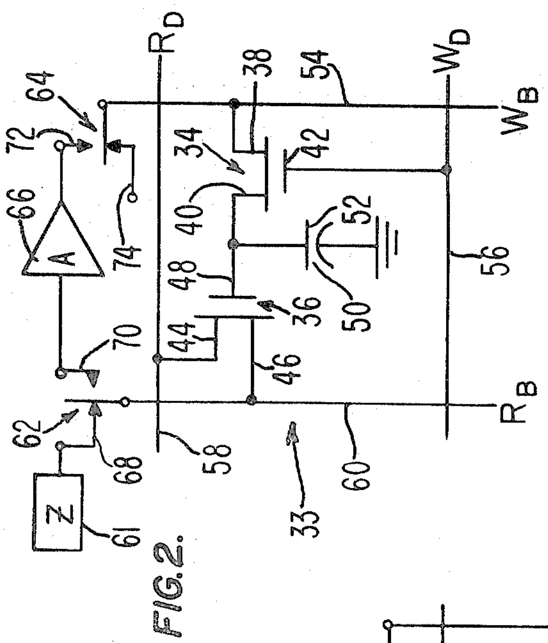
FIG. 2.
| INFORMATION | $R_B$ | $R_D$ | $W_B$ | $W_D$ |
| --- | --- | --- | --- | --- |
| WRITE "1" | 0 | 0 | +15 | +20 |
| WRITE "0" | 0 | 0 | 0 | +20 |
| READ "1" | +5 | +20 | 0 | 0 |
| READ "0" | 0 | +20 | 0 | 0 |
FIG. 4.
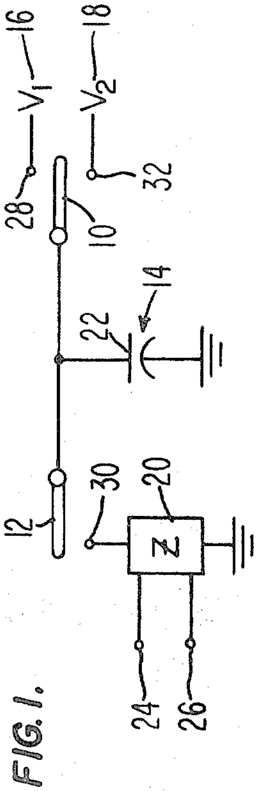
FIG. 1.
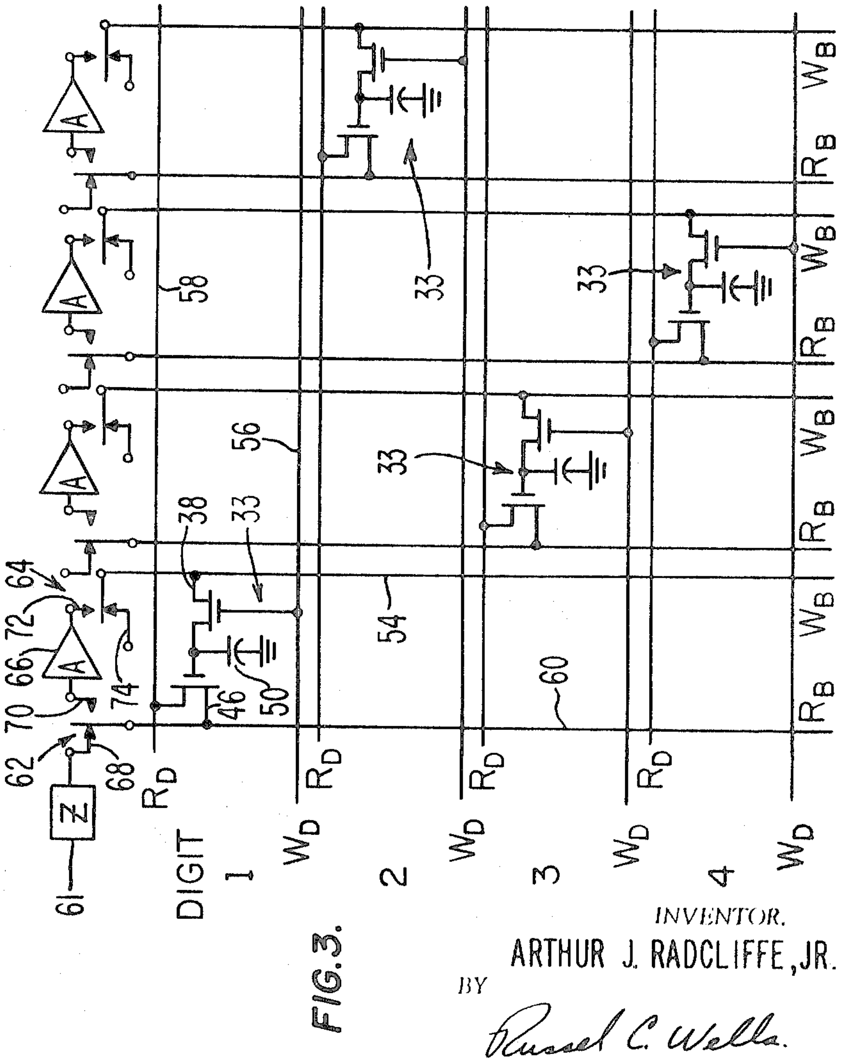
FIG. 3.
INVENTOR.
ARTHUR J. RADCLIFFE, JR.
BY
Russel C. Wells
ATTORNEY.

INFORMATION STORAGE DEVICE

SUMMARY OF INVENTION

An information storage device of capacitive memory cell having a first insulated gate field-effect transistor functioning as the "write" input to the cell. A second insulated gate field-effect transistor is electrically connected to the first transistor and functions to control the "read" output from the memory cell. Information supply means electrically connected by a signal line to the first transistor to supply a voltage signal representative of binary information. Control means, which may function as a digit-addressing scheme, is electrically connected by a second signal line to the gate electrode of the first transistor. A capacitor is electrically charged through the first transistor to the information supply means under the control of the signal on the gate electrode. Output supply means, which may function as a digit-addressing scheme during a "read" operation, is electrically connected by a third signal line to the second transistor. The output of the second transistor is electrically connected by a fourth signal line to an impedance which is responsive to the state of conduction of the second transistor. The voltage charge on the capacitor, which is electrically connected to the gate of the second transistor, controls the conduction of the second transistor in response to the supply means.

DESCRIPTION OF DRAWINGS

In the drawings:

FIG. 1 is a schematic representation of a basic capacitive memory cell;

FIG. 2 is a schematic representation of the preferred embodiment of the capacitive memory cell of FIG. 1;

FIG. 3 is a schematic representation of a memory system; and

FIG. 4 is a table of voltage values for the memory cell of FIG. 2.

DETAILED DESCRIPTION

FIG. 1 illustrates the basic concept of a capacitive memory cell, by showing a pair of switch members 10 and 12 electrically connected together and a capacitor 14 electrically connected between the switch members and ground. The first switch member 10, normally biased in an opened position, is switchable between two voltages. $V_1$ 16 and $V_2$ 18. The second switch member 12 which is also normally biased in an opened position, is switchable to connect an impedance 20 to the upper plate 22 of the capacitor 14. A pair of terminals 24 and 26 electrically connected to the impedance 20, are used for measuring the voltage across the impedance.

If the circuit, as illustrated in FIG. 1, were to be used as a memory cell in a computer, the first switch member 10 would function as the "write" input, the capacitor 14 would function as the storage member and the second switch member 12 would function as the "read" output of the memory cell. The impedance 20 which may be a resistor, would generate a voltage in response to the voltage charge on the capacitor 14. For the purpose of illustration, the capacitor 14 is completely discharged and the voltage $V_1$ 16 is a plus 15 volts and the voltage $V_2$ 18 is ground. Also, the information to be stored in the memory cell is defined as a binary one when represented by a voltage equal to $V_1$ or a binary zero when represented by a voltage equal to $V_2$. To "write" a binary one into the cell, the switch member 10 is transferred to the terminal 28 electrically connecting the upper plate 22 of the capacitor 14 to the voltage source of $V_1$. The charging current of the capacitor 14 flows through the switch member 10 to charge the upper plate 22 of the capacitor 14 to the voltage $V_1$. When the capacitor is fully charged, the switch member 10 is returned to its open position. The memory cell now contains binary one information.

Reading of the memory cell is accomplished by transferring the second switch member 12 to the terminal 30 electrically connecting the upper plate 22 of the capacitor to the impedance 20. The discharge current of the capacitor 14 flowing through the impedance 20 to ground develops a voltage signal across the terminals 24 and 26 representative of the binary one value of the stored information.

In a like manner, a binary zero may be stored in the capacitor by transferring the first switch member 10 to terminal 32 which is electrically connected to $V_2$. If the capacitor 14 is charged at this time it will discharge to a voltage equal to $V_2$, or if the capacitor is not charged, then the capacitor will charge to a voltage equal to $V_2$. The first switch member 10 is then returned to its open position. Transferring the second switch member 12 to the terminal 30, no flow of discharge current from the capacitor 14 will take place through the impedance 20 because of the lack of charge voltage on the capacitor. The voltage measured across the terminals 24 and 26 will be equivalent to the binary zero signal.

In accordance with the above description, the preferred embodiment of a capacitive memory cell 33 as shown in FIG. 2, comprises a first field-effect transistor 34 and a second field-effect transistor 36. The first field-effect transistor 34 comprises an input or source electrode 38, an output or drain electrode 40, and a control or gate electrode 42. Likewise the second field-effect transistor 36 has an input or source electrode 44, an output or drain electrode 46 and a control or gate electrode 48 which is electrically connected to the drain electrode 40 of the first transistor. A capacitor 50 is electrically connected between the gate electrode 48 of the second transistor 36 and ground with its upper plate 52 electrically connected to the gate electrode 48. The source electrode 38 of the first transistor 34 is electrically connected to an information supply means 54 hereinafter referred to as the "write bit" or $W_B$ line. The gate electrode 42 of the first transistor is electrically connected to a control means 56 hereinafter referred to as the "write digit" or $W_D$ line. The source electrode 44 of the second transistor 36 is electrically connected to a supply means 58 hereinafter referred to as the "read digit" or $R_D$ line. The drain electrode 46 of the second transistor is electrically connected by a conductor 60 hereinafter referred to as the "read bit" or $R_B$ line to an impedance 61. The two transistors 34 and 36 in the preferred embodiment are insulated gate field-effect transistors which have the characteristics closely approaching the so-called perfect switch which are basically an extremely low-leakage current between the individual electrodes and extremely high-speed operating times when effecting conduction between the source drain electrodes under control of the gate electrode. In the particular embodiment shown, both transistors are N-enhancement-type units. The capacitor 50 may be a discrete component, or may be fabricated on the same chip as the transistors or may be the inherent capacitance to ground of the gate 48 and the drain 40 electrodes and the lead connecting these two electrodes.

The operation of the memory cell 33 of the preferred embodiment is explained by using the table of FIG. 4 with the circuit of FIG. 2. The information to be stored within the cell is either a binary one which is represented by a voltage equal to plus 15, or binary zero which is represented by zero voltage. To store a binary one, the information to be stored in the cell appears on the $W_B$ line as plus 15 volts. When the information is to be stored in the cell, the $W_D$ line is elevated from zero volts to some voltage preferably greater than the $W_B$ signal or plus 20 volts. The first transistor will then conduct from its input electrode 38 to its output electrode 40 and through the capacitor 50 to ground. The upper plate 52 of the capacitor is charged to a voltage of approximately plus 10 volts. This voltage is equal to the voltage on the $W_B$ line 54 minus the voltage drop across the transistor. When the capacitor is fully charged, the voltage on the $W_D$ line is returned to zero turning off the first transistor 34.

To read the memory cell 33 the voltage from the $R_D$ line is elevated from zero to plus 20 volts. If, as previously indicated the capacitor 50 is charged, the second transistor 36 will conduct current from its input electrode 44 to its output electrode 46 under control of the voltage on its gate electrode 48. The $R_B$ conductor 60 as previously mentioned, electrically connects the output electrode 46 to an impedance means 61 for generating a signal equivalent to the information stored on the capacitor. In the preferred embodiment, the impedance means 61 is essentially the infinite input impedance of an insulated gate field-effect transistor.

A binary zero is stored in the cell by placing zero voltage on the $W_B$ line causing the capacitor 50 to discharge through the first transistor 34 when there is a voltage on the $W_D$ line 56. With the cell containing a binary zero when the $R_D$ line is elevated to plus 20 volts during a "read" operation, the second transistor 36 does not conduct and therefore no current flows through the $R_B$ conductor 60.

FIG. 3 represents a 3×4 memory matrix system comprising 16 memory cells 33. Each horizontal row of FIG. 3 represents a unit of information such as a digit and each vertical column represents a portion of the codal representation of the unit of information such as a binary value bit. Electrically coupled to the $R_B$ and $W_B$ lines of each column is a pair of switches 62 and 64 and an amplifier 66 electrically connected therebetween. The normally closed contact 68 of the first switch 62 electrically connects the $R_B$ line to the impedance 61 and the normally opened contact 70 electrically connects the $R_B$ line to the input of the amplifier 66. The output of the amplifier 66 is electrically connected to the normally opened contact 72 of the second switch 64 and the normally closed contact 74 electrically connects the information supply means to the $W_B$ line 54 as previously mentioned.

THe above-described switch and amplifier combination function to regenerate each cell in a manner as will hereinafter be described. The length of time which each memory cell retains the information stored therein, is defined by the following equation:

$$T_H = C\Delta V / I_L$$

where $T_H$ is the hold time in seconds, $C$ the value of the capacitor in farads, $\Delta V$ is the allowed voltage change during time $T_H$ and, $I_L$ is the leakage current to and from the capacitor in amperes.

The size of the capacitor is, in the preferred embodiment, a function of the geometry of the memory cell chip. For the purposes of illustration, the value of the capacitor 50 is 1 picofarad which is equivalent to 2.5 square mills of substrate area for a typical silicon oxide dielectric thickness of 1,000 A. The term substrate referring to the silicon chip upon the surface of which the memory cell is fabricated. The capacitance is the total capacitance measured from the diffusion layer making up the drain 40 of the first transistor 34 to the grounded substrate, from the metal layer making up the gate 48 of the second transistor 36 to the grounded substrate and from the metal layer lying on the surface of the dielectric, which interconnects the drain 40 and the gate 48, to the grounded substrate.

The allowed voltage change during the holding time is in the preferred embodiment, limited to 1 volt. This voltage change may be increased or decreased according to the environment of the memory cell.

The leakage current is defined by the characteristics of the associated transistors. Typically, the leakage current through the source drain electrodes of the first tranbistor 34 can be assumed to be 1 nanoampere and the leakage current through the gate electrode of the second transistor 36 can be assumed to be 1 picoampere.

With the above values, the holding time according to the above equation is equal to 1 millisecond. If the information is to be retained in the memory cell for a period of time greater than 1 millisecond, a regeneration cycle must be provided to maintain the charge on the capacitor 50.

The regeneration cycle is basically a read-write operation wherein the memory cell 33 is addressed by the $R_D$ line and the resultant signal on the $R_B$ is supplied to the amplifier 66. The input threshold level of the amplifier 66 is at a value which is equivalent to the binary one signal output of a memory cell as degraded or reduced during the holding time; therefore, the amplifier will have no output when a binary zero is read from the cell. The output of the amplifier 66 is considered as new information and is stored in the memory cell 33 under control of the $W_D$ line. For regeneration of each cell, the switches 62 and 64 electrically connect the amplifier 66 between the $R_B$ line and the $W_B$ lines. The switches may be transferred simultaneously or sequentially with the first switch 62 being the first actuated switch.

To form a sequential read-write regeneration operation, the switch 62 is transferred to the normally closed contact 70. The input of the amplifier is now electrically connected to the $R_B$ line 60 of each cell in the left hand column of FIG. 3. The $R_D$ line 58 corresponding to the first digit of the uppermost row of FIG. 3 is elevated to plus 20 volts as hereinbefore described. If at this time the voltage signal on the $R_B$ line 60 is greater than plus 5, the amplifier will function to amplify this signal to plus 15 volts. Since this is sequential operation, the amplifier also contains a temporary storage device or delay means until the write operation takes place. The first switch 62 is returned to its normal position and the second switch 64 is transferred to its normally open contact 72. The output of the amplifier is electrically connected to the $W_B$ line 54 of the first column in FIG. 3. The $W_D$ 56 is now elevated to plus 20 volts causing the capacitor 50 to charge to the output voltage of the amplifier 66.

It is readily apparent from the above description that each bit comprising the first digit may be regenerated simultaneously in the above manner.

In a like manner, each cell may be regenerated by a simultaneously read and write operation. Regeneration by a simultaneous read-write operation connects the drain electrode 46 of the second transistor 36 through the amplifier 66 to the source electrode 38 of the first transistor 34. Both the $R_D$ line 58 and the $W_D$ line 56 are simultaneously elevated to plus 20 volts causing the capacitor to be maintained at a level of charge coincident with the voltage signal on the $R_B$ line.

In FIG. 3 only four memory cells 33 are shown but it is to be understood that there are four identical memory cells in each row. Also, the first and second switches 62 and 64 are shown as conventional mechanical switches, however, it is to be understood that these are merely schematic representations and in the preferred embodiment these may be field-effect transistor devices. Also shown with each column are the first and second switches and the amplifier for regenerating each cell in the column. Since the operation for each cell is identical with the first cell in the left-hand column, the several identical reference characters are omitted from the cells in columns two, three, and four.

There has been shown and described a capacitive memory system utilizing a plurality of memory cells. Each cell is controlled by a pair of insulated gate field-effect transistors electrically connected together and to a capacitor storage member. The charge voltage on the capacitor is representative of the binary value of the information stored within each memory cell. A regeneration system is shown to maintain the stored information for a period of time.

What is claimed is:

1. An information storage device comprising:

a first voltage source representing a binary one value of information;

a second voltage source representing a binary zero value of information, said second source different than said first source;

a first switch member normally biased in an open position and switchable between either one of said two voltage sources;

a second switch member normally biased in an open position and switchable to a closed position, said second switch member electrically connected to said first switch member;

impedance means electrically connected between the closed position of said second switch member and ground; and a capacitor electrically connected between said first and second switch members and ground, said capacitor charged through said first switch member to either one of said two voltage sources in accordance with the information to be stored and said capacitor discharged through said second switch member and said impedance means developing an electrical signal across said impedance means representative of the value of the stored information.

2. A information storage device for storing binary valued information comprising:

a first field-effect transistor having an input electrode, an output electrode and a control electrode, a second field-effect transistor having an input electrode, an output electrode and a control electrode, said control electrode electrically connected to the output electrode of said first transistor, information supply means supplying a first potential for binary one information and a second potential for binary zero information, said supply means electrically connected to the input electrode of said first transistor, control means electrically connected to the control electrode of said first transistor controlling the conduction of said first transistor.

supply means electrically connected to the input electrode of said second transistor supplying a source of potential to be conducted through said second transistor in response to the control electrode of said second transistor, impedance means electrically connected to the output electrode of said second transistor, and a capacitor electrically connected between the control electrode of said second transistor and ground, said capacitor charged to the potential of said information supply means through said first transistor and electrically controlling the conduction of said second transistor in response to said supply means.

3. The information storage device according to claim 2 wherein said first and second field-effect transistors are P-enhancement-mode insulated gate field-effect transistors.

4. The information storage device according to claim 2 further including regenerating means electrically coupled between the output electrode of said second transistor and the input electrode of said first transistor to maintain the charge potential on said capacitor.

5. A memory system comprising:

a plurality of memory cell storage means arranged to represent a unit of information having a codal representation equal to number of cells, an information supply means supplying the codal representation of a unit of information, an input control conductor electrically connecting all of said plurality of memory cell storage means with said information supply means, an input supply conductor electrically connecting each cell storage means with said information supply means, output means, an output control conductor electrically connecting all of said plurality of memory cell storage means with said output means, an output sense conductor electrically connecting each cell storage means with said output means, and regeneration means electrically coupled between said output sense conductor and said input supply conductor, said regenerating means operatively responsive to the said output control conductor to transfer the electrical signal generated by said cell storage means on said output sense conductor to said input supply conductor to retain said information within said memory cell storage means.